US012799774B2

(12) United States Patent
Zhang et al.

(10) Patent No.: US 12,799,774 B2
(45) Date of Patent: Nov. 17, 2026

(54) ENCLOSURE LATCH SYSTEM

(71) Applicant: Digilock Asia Ltd., Kowloon (HK)

(72) Inventors: An Zhang, Shaoguan (CN); Asil Gokcebay, Petaluma, CA (US)

(73) Assignee: Security People, Inc., Houston, TX (US)

( * ) Notice: Subject to any disclaimer, the term of this patent is extended or adjusted under 35 U.S.C. 154(b) by 1323 days.

(21) Appl. No.: 17/154,757

(22) Filed: Jan. 21, 2021

(65) Prior Publication Data

US 2021/0140198 A1 May 13, 2021

Related U.S. Application Data

(63) Continuation of application No. 16/426,544, filed on May 30, 2019, now Pat. No. 10,914,098.

(51) Int. Cl.
*E05B 41/00* (2006.01)
*E05B 17/10* (2006.01)
(Continued)

(52) U.S. Cl.
CPC .......... *E05B 41/00* (2013.01); *E05B 47/0012* (2013.01); *E05B 65/44* (2013.01); *G07C 9/00174* (2013.01); *E05B 17/10* (2013.01); *E05B 2047/0024* (2013.01); *E05B 2047/0058* (2013.01); *E05B 2047/0094* (2013.01); *Y10T 292/1082* (2015.04)

(58) Field of Classification Search
CPC ............... Y10T 292/1082; E05B 17/10; E05B 2047/0024; E05B 2047/0058; E05B 2047/0094; E05B 65/44; E05B 41/00; E05B 47/0012; G07C 9/00174
See application file for complete search history.

(56) References Cited

U.S. PATENT DOCUMENTS 1,154,142 A * 9/1915 Teich .................. E05B 27/0053 70/438
1,177,151 A * 3/1916 Teich ...................... E05B 41/00 70/438
(Continued)

FOREIGN PATENT DOCUMENTS

WO 2018/024141 2/2018

OTHER PUBLICATIONS

EPO Machine Translation of Description of WO2018/024141.

*Primary Examiner* — Christine M Mills
*Assistant Examiner* — Faria F Ahmad

(57) ABSTRACT

A latch system has a latch hook pivotably mounted in the housing between a closed position and an open position. It further includes an actuating lever pivotably mounted in the housing between a locked position and an unlocked position. When the actuating lever is in the locked position and the latch hook is in the closed position, the actuating lever maintains the latch hook in the closed position, and when the actuating lever is in the unlocked position, the actuating lever does not interfere with movement of the latch hook between the open position and the closed position. The system can further include a mechanical indicator, and when the actuating lever is in the locked position, the indicator provides a locked indication, and when the actuating lever is in the unlocked indication position, the indicator provides an unlocked indication.

21 Claims, 17 Drawing Sheets

(51) Int. Cl.

| | |
|---|---|
| ***E05B 47/00*** | (2006.01) |
| ***E05B 65/44*** | (2006.01) |
| ***G07C 9/00*** | (2020.01) |

(56) References Cited

U.S. PATENT DOCUMENTS 2,638,770 A * 5/1953 Gutman .................. E05B 41/00 70/438
3,336,775 A * 8/1967 Russell ................... E05B 41/00 70/438
3,600,916 A * 8/1971 Ruppert .................. E05B 41/00 292/169.18
4,101,745 A 7/1978 Smith
4,262,507 A * 4/1981 Flack ...................... E05B 41/00 70/432
4,978,153 A 12/1990 Hirsch et al.
5,301,988 A * 4/1994 Davenport .............. E05C 3/042 70/432
5,678,436 A * 10/1997 Alexander .......... E05B 47/0012 70/456 R
6,382,690 B1 * 5/2002 Dessenberger, Jr. ... E05B 41/00 292/113
6,516,643 B1 * 2/2003 Olshausen .............. E05B 41/00 70/432
6,811,118 B2 * 11/2004 Collet ..................... B64C 25/26 292/216
6,883,357 B1 * 4/2005 Cheng ................. E05B 47/0038 70/91
7,159,422 B1 * 1/2007 Misner .................. E05B 35/105 70/284
7,339,472 B2 * 3/2008 Pierson ................... E05B 9/084 70/432
7,464,627 B2 * 12/2008 Ko .......................... E05B 81/28 74/25
7,552,607 B2 * 6/2009 Yang ..................... E05B 35/105 70/432
7,647,797 B1 * 1/2010 Viso Cabrera ...... E05B 47/0673 292/144
8,328,299 B2 * 12/2012 Hashemi .............. A47B 88/463 312/333
8,353,184 B2 * 1/2013 Ling ....................... E05B 39/00 70/284
8,474,887 B2 * 7/2013 Suzuki .................... E05B 81/20 292/216
8,555,686 B2 * 10/2013 Meekma ............... E05B 37/166 70/309
8,562,034 B2 * 10/2013 Hirota .................. H02H 7/0851 292/216
9,672,673 B1 6/2017 Gokcebay
9,915,082 B2 * 3/2018 Garneau ................. E05B 65/46
10,151,126 B2 * 12/2018 Cumbo ................... E05B 85/20
10,448,738 B2 * 10/2019 Hashemi .............. A47B 88/477
2001/0005078 A1 * 6/2001 Fukushima ............. E05B 81/14 292/201
2001/0005079 A1 * 6/2001 Takamura .............. E05B 81/20 292/201
2001/0005080 A1 * 6/2001 Inoue ...................... E05B 77/24 292/216
2002/0030366 A1 * 3/2002 Swan ...................... E05B 81/14 292/201
2002/0089188 A1 * 7/2002 Edgar ..................... E05B 81/16 292/216
2002/0117862 A1 * 8/2002 Yamauchi ............... E05B 81/20 292/216
2004/0212197 A1 * 10/2004 Shoemaker ......... E05B 65/0847 292/216
2006/0012186 A1 * 1/2006 Zillert ..................... E05B 81/20 292/216
2006/0055180 A1 * 3/2006 Kachouh ................. E05B 77/36 292/216
2006/0227000 A1 * 10/2006 Wu ......................... E05B 41/00 340/686.1
2007/0152455 A1 * 7/2007 Ko .......................... E05B 81/16 292/201
2008/0295550 A1 * 12/2008 Schmidt .................. E05B 65/10 70/144
2010/0078945 A1 * 4/2010 Imatomi ................. E05B 81/20 292/216
2011/0016938 A1 * 1/2011 Chi ......................... E05B 41/00 70/432
2011/0056253 A1 * 3/2011 Greiner ............... E05B 47/0002 70/277
2011/0227351 A1 * 9/2011 Grosdemouge ......... E05B 85/02 292/201
2012/0248793 A1 * 10/2012 Fiedler ............... A44B 11/2592 70/330
2013/0069514 A1 * 3/2013 Hashemi .............. A47B 88/473 292/144
2013/0320032 A1 * 12/2013 Rahilly ..................... E05C 3/24 292/200
2015/0145263 A1 * 5/2015 Farris ...................... E05B 85/26 292/195
2015/0225982 A1 * 8/2015 Bronner .............. E05B 63/0017 70/432
2015/0240537 A1 * 8/2015 Cumbo ................... E05B 77/06 292/200
2016/0145913 A1 * 5/2016 Machida ................. E05B 81/36 292/196
2016/0160535 A1 6/2016 Haidvogl
2018/0033227 A1 2/2018 Gokcebay

* cited by examiner

ENCLOSURE LATCH SYSTEM

FIELD OF THE DISCLOSURE

The presently disclosed subject matter relates generally to the field of latch systems, and more specifically, to latch systems for furniture items that provide feedback to the user as to the lock status.

BACKGROUND

Many different types of cabinets, desks, boxes, furniture, and the like, hereafter collectively referred to as enclosures, may be provided with doors or drawers (or both) to provide access to their respective interiors. Such enclosures may require the use of latch systems to control access into their respective interiors.

Certain latch systems are mounted completely internal to the enclosure to maintain a clean appearance of the enclosure. The latch systems include a housing mounted to an interior surface of the enclosure, and the housing has an internal latch hook. The system further includes a strike, typically in the form of a metal loop or hook, affixed to the interior side of the door or drawer. When the door or drawer is closed, the strike contacts the latch hook, and the latch hook closes about the strike, thereby locking the door or drawer in a closed position.

These types of systems have been configured with electronic controls and actuation to provide secure access control. Electronic latch systems are advantageously easy to lock and unlock, are reprogrammable, and do not require a mechanical key. Electronic latch systems typically include, in part, a microprocessor and an actuating device such as a solenoid or electronic motor. The system receives a control signal, and the microprocessor triggers the actuating device to move the latch hook between a locked position and an unlocked position. The control signal can be sent wirelessly, for example via RFID, NFC, Bluetooth, or BLE, or it can be sent through hardwires connecting an input device to the microprocessor.

Electronic latch systems require a power supply to power the electronic components, including the microprocessor, the actuating device, the receiver for the wireless signal, sensors, and the like. In one example, the power supply is hard-wired from the building's electrical system. But this may be inconvenient, as it may require an electrician to connect the power supply to the latch system, there may be no convenient source of power near the system, and the user must contend with power cord management.

In the case of a battery power supply, the batteries can only provide power to the electronic latch system for a limited period of time, or a limited number of cycles, before they are fully discharged. Once the batteries are discharged, the latch system may no longer be operable. The user must replace the batteries which, although less inconvenient that hard-wiring, can still be a hassle.

It would be advantageous for a latch system to both wirelessly receive credentials, but at the same time be powered by battery and have a commercially acceptable lifetime of usage. Further, it would be advantageous for that wirelessly-operated latch system to be connected wirelessly to a controller, such that the controller can both direct operation of the latch system as well as receive data and feedback from the latch system regarding, for example, lock status.

While an internal electronic latch system as described above is attractive, easy to use, and does not impair the aesthetics of the enclosure, there is no visual feedback to the user letting them know the lock status of the enclosure. This type of feedback would be particularly helpful for those systems that allow a door or drawer to be closed, but remain unlocked. In other words, it would benefit a user to have a visual indication that although the door or drawer is in the closed position, the latch is or is not locked, and whether a person can open the enclosure without first providing access credentials. But an electronic, battery-powered lock has a limited amount of power to supply. Requiring a light, or even an LED, to be lit continuously to indicate the locked or unlocked position would place a load on the battery.

It would therefore be advantageous to provide a latch system as described above with a visual feedback indicator of the lock status that does not require electric current. Such a configuration would minimize power usage and, in one example, extend battery life.

In another aspect, electronic latch systems can be configured to operate in different modes, depending on the end user's or facilities' needs. An enclosure such as a health club locker, which is being used daily by different users, has different needs than an enclosure that is used daily by the same individual, such as a lock in a cabinet in an assigned office or a hall locker for a student. In the former, also known as "shared use," the user approaches an empty locker, places his belongings within the locker, then enters a code for the lock. Upon entering the code, the lock both locks the latch system and sets the credentials to re-open the system to the code entered by the user. After using the health club facilities, the user can re-enter the same code, the latch system will open, and the user can retrieve his belongings. That code, however, will no longer be in use (unless re-entered). In an assigned use latch system, on the other hand, the user has a code that she uses each day, and the code does not reset. Thus, a student with a school locker can access her locker using the same code every day.

It would also be advantageous to have a latch system as described above having an actuator system that can quickly and easily be set to or converted between assigned use functionality and shared use functionality.

SUMMARY

In one non-limiting example, a latch system that provides lock status feedback includes a housing and an actuating lever pivotably mounted in the housing that is pivotable between a locked position and an unlocked position. It further includes a latch hook pivotably mounted in the housing between a closed position and an open position. When the actuating lever is in the locked position and the latch hook is in the closed position, the actuating lever maintains the latch hook in the closed position, and when the actuating lever is in the unlocked position, the actuating lever does not interfere with movement of the latch hook between the open position and the closed position. The latch system may further include an indicator lever pivotably mounted in the housing and operatively coupled to the actuating lever, wherein pivoting of the actuating lever between the locked position and the unlocked position selectively translates the indicator lever between a locked indication position and an unlocked indication position. The latch system can include a strike, such that the latch hook can engage the strike when in the locked position. Finally, the latch system can include an indicator operatively coupled to the indicator lever, wherein when the indicator lever is in the locked indication position, the indicator provides a locked indication, and when the indicator lever is in the unlocked indication position, the indicator provides an unlocked indication.

DETAILED DESCRIPTION

Figure 1:
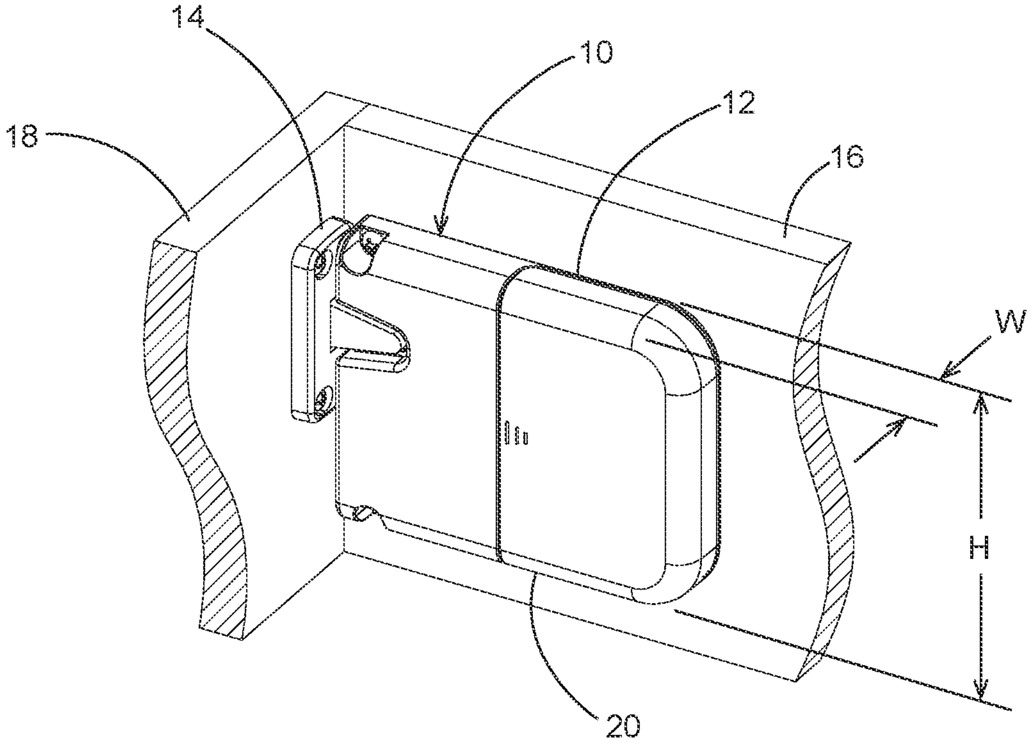
FIG. 1 is a perspective view of a first example of a latch system according to the present disclosure.

FIG. 1 depicts a latch system 10 according to one example of the present subject matter. The latch system 10 includes a main housing 12 with height H and a width W. The latch system 10 further includes a strike 14. The latch system 10 is mounted to the interior of an enclosure 16, and in particular, the strike 14 is mounted to the interior side of a door 18 of the enclosure 16. As will be described in detail herein, when the door 18 is in the closed position (as shown in FIGS. 1 and 2) and the latch system 10 is in the locked position, the main housing 12 can engage the strike 14 and lock the door 18 in the closed position.

Figure 2:
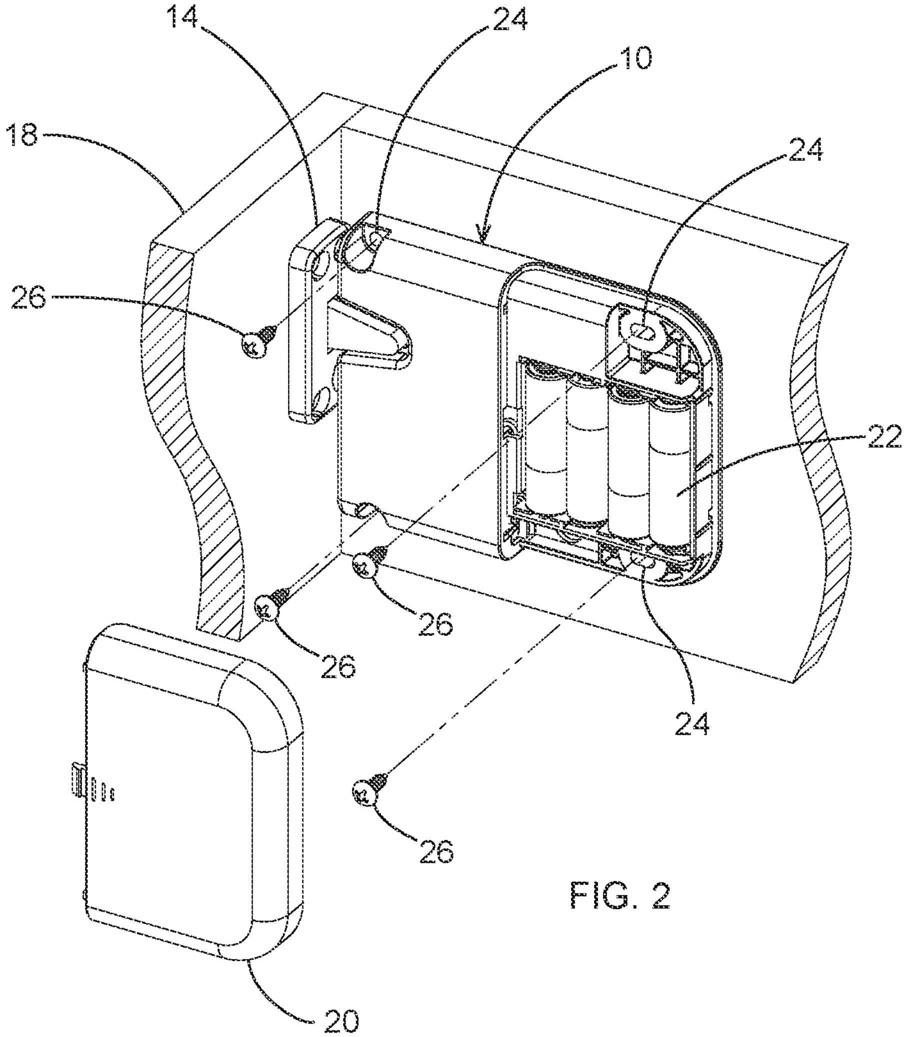
FIG. 2 is a perspective view of the latch system of FIG. 1 with the battery cover removed.

FIG. 2 depicts the latch system 10 with a battery cover 20 of the main housing 12 removed. The latch system 10 in this example is self-contained, i.e. it does not need to be separately hooked up to line power, and is powered by four AA batteries 22 oriented vertically, as oriented in FIG. 2. Of course, the latch system 10 can be configured to be powered by line power, either alternatively to batteries 22 or in addition to batteries 22, if desired. The batteries 22 can be connected in series or otherwise suitably connected together to provide power to the latch system 10, as is known in the art. The latch housing 12 can include four mounting holes 24, two of which are revealed by removing the battery cover 20, and the latch housing 12 can be mounted to the enclosure 16 with four wood screws 26. The battery cover 20 can be removably attached to the housing 12 in any suitable manner known, and in this example is a snap fit. Although threaded fasteners are depicted herein, other methods of fastening the main housing 12 to the enclosure 16 will be seen by those of skill in the art.

Figure 3:
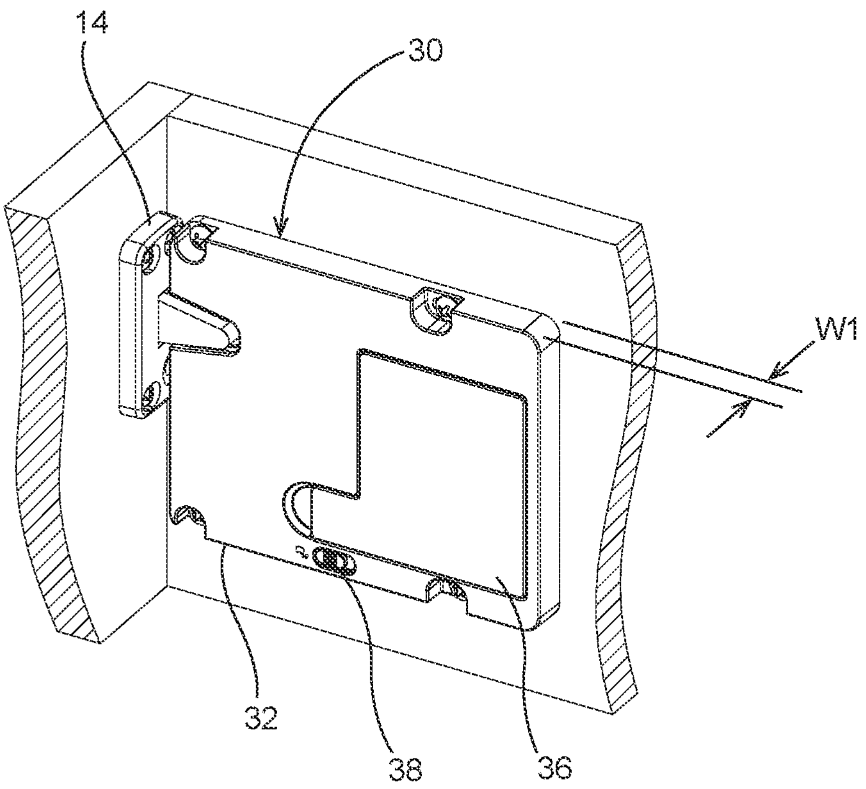
FIG. 3 is a perspective view of a second example of a latch system according to the present disclosure.
Figure 4:
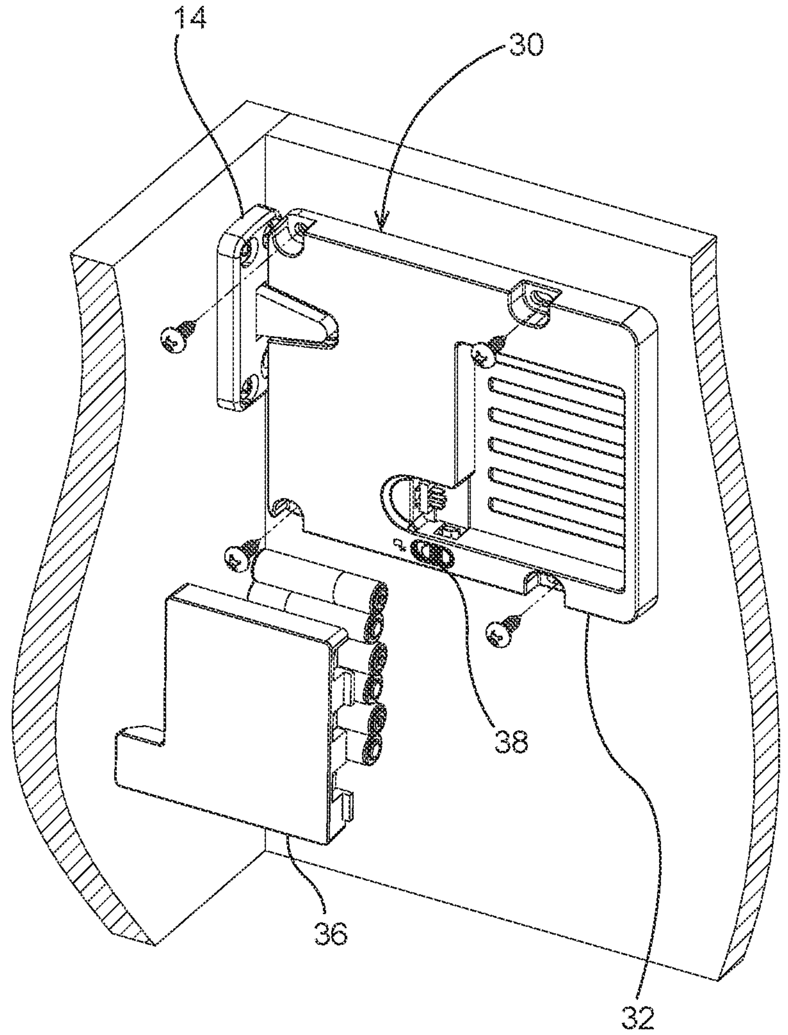
FIG. 4 is perspective view of the latch system of FIG. 3 with the battery cover removed.

FIGS. 3 and 4 depict a second example of a latch system 30 with a main housing 32 and the same strike 14 as depicted in FIGS. 1 and 2. While the latch system 30 is similar to the latch system 10 of FIGS. 1 and 2 in many respects, in this example, the main housing 32 includes a battery cover 36 that is secured with a latch 38. Further, the latch system 30 is powered by six AAA batteries rather than four AA batteries, resulting in a reduced overall width W1 of the main housing 32. The reduced width W1 can be helpful in locating the main housing 32 in a smaller space within an enclosure, such as between the body of a drawer and an enclosure sidewall.

Figure 5:
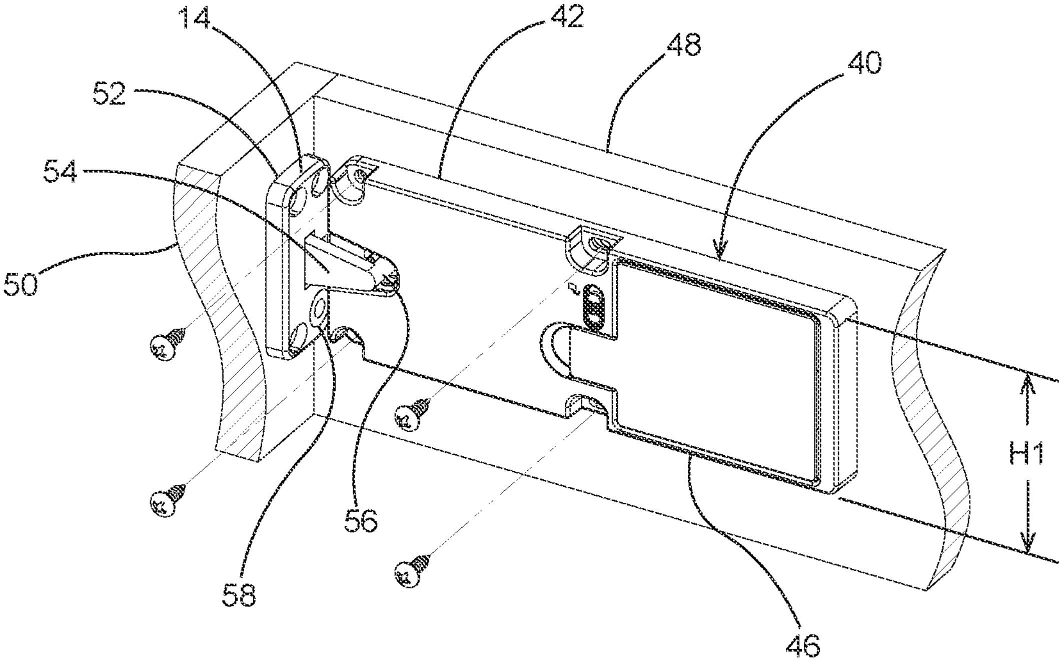
FIG. 5 is a perspective view of a third example of a latch system according to the present disclosure.

FIG. 5 depicts a third example of a latch system 40. The latch system 40 includes a main housing 42 and again the same strike 14 as depicted in FIGS. 1-4. The main housing 42 further includes a removable battery cover 46. Further, in this example, the latch system 40 is powered by six AAA batteries (not shown), but the batteries are oriented vertically, similar to the orientation of the batteries 22 shown in FIG. 2. In this configuration, the main housing can have a height H1 that is reduced as compared to height H of the first example. The latch system 40 may be more suitably used in conjunction with an enclosure 48 having a comparatively short height such as a shallow drawer, and the strike 14 is mounted to an interior surface of a drawer front 50. In another example not shown, a power supply compartment housing the batteries may be detachable from the main housing 42, such that when the batteries need to be replaced, a user can detach the power supply compartment from the main housing 42, replace the batteries within the compartment, then reattach the power supply to the main housing 42.

FIG. 5 depicts the strike 14 in greater detail. The strike 14 includes a mounting plate 52, an upright 54, and a latch rod 56 that is generally parallel to the mounting plate 52. The strike 14 further includes an indicator cylinder 58 that will be described more fully below. As is known, the main housing 42 engages the latch rod 56 to secure the drawer front 50 of the enclosure 48 to place the latch system 40 a locked position.

Figure 6:
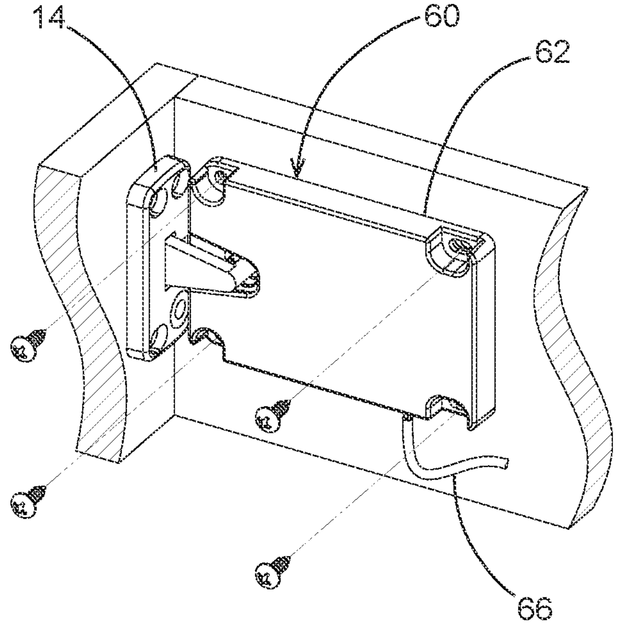
FIG. 6 is a perspective view of a fourth example of a latch system according to the present disclosure.

A fourth example of a latch system 60 having a main housing 62 and the strike 14 is depicted in FIG. 6. In this example, the latch system 60 is powered by an external power source through a cable 66 and includes no battery compartment. In all other relevant regards, it is the same as the example shown in FIG. 5.

Figure 7:
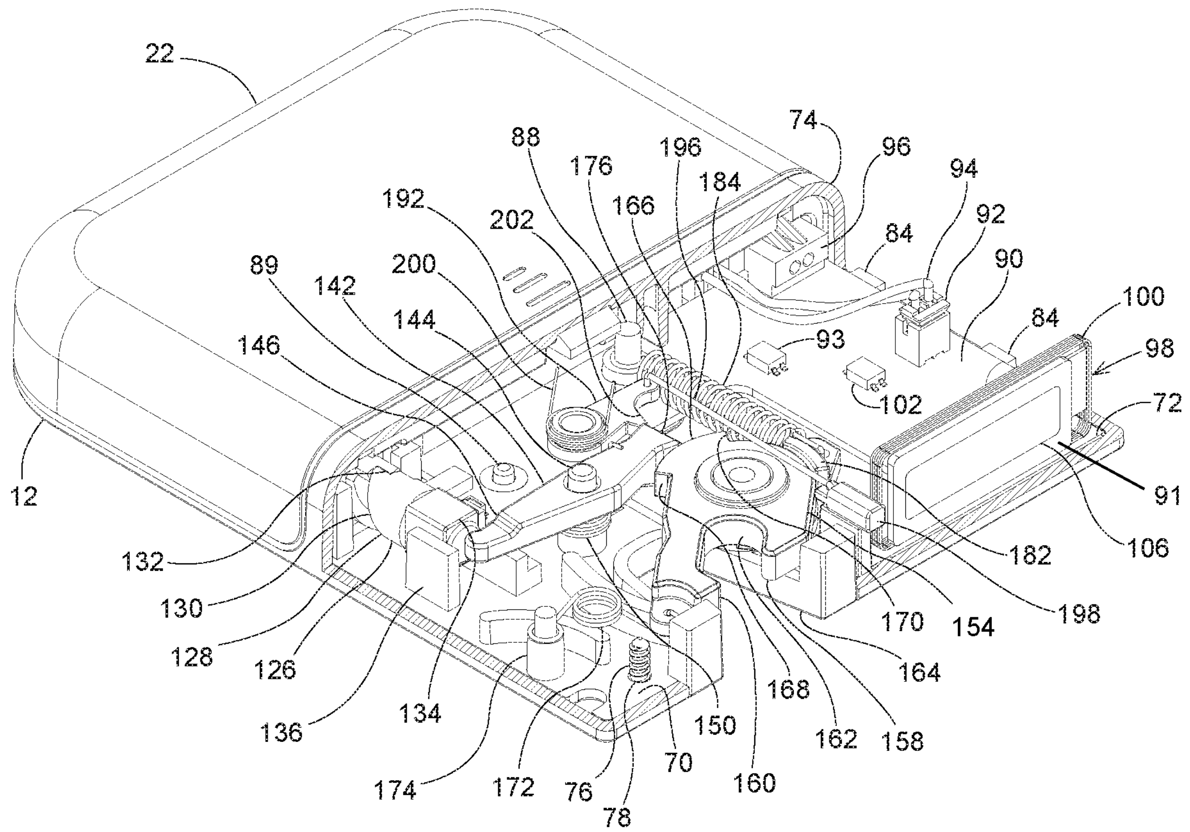
FIG. 7 is a perspective view of the latch system of FIG. 1 with a portion of the main housing in cut-away.
Figure 7A:
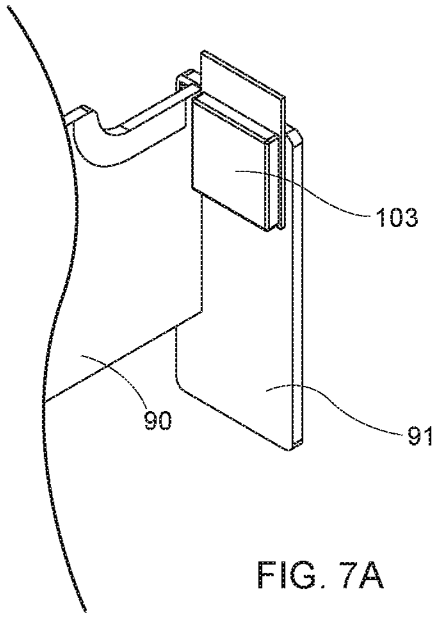
FIG. 7A is a detail schematic of a back side of a second circuit board of the latch system of FIG. 1.
Figure 8:
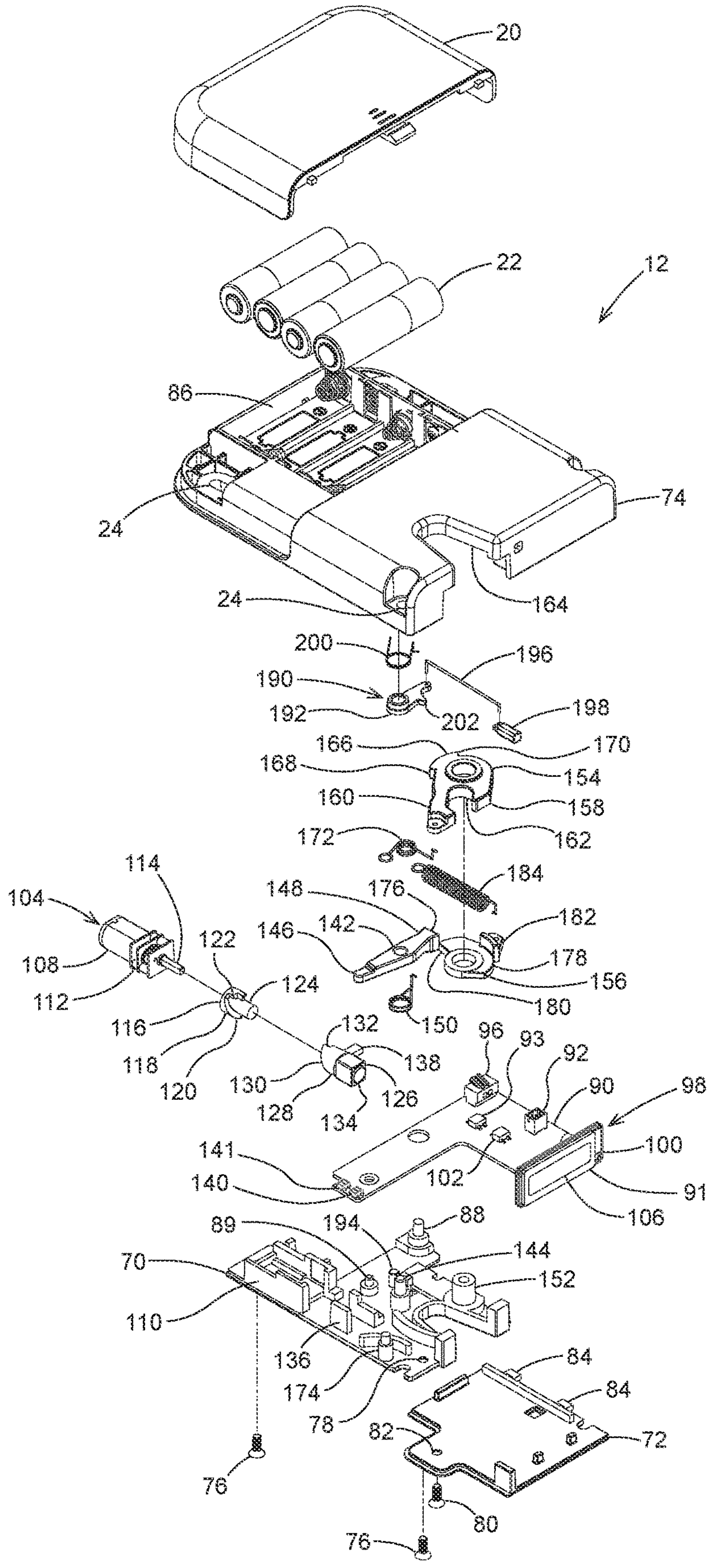
FIG. 8 is an exploded perspective view of the latch system of FIG. 1.

With reference to FIGS. 7, 7A, and 8, the internal components of the main housing 12 of the latch system 10 are depicted. The main housing 12 includes a first base plate 70, a second base plate 72, and a cover 74. The first base plate 70 is mounted to the cover 74 via two threaded fasteners 76 that extend through a set of mounting holes 78 (only one of which is visible) in the first base plate 70 into receiving holes (not shown) in the cover 74. The first base plate 70 can be attached to the cover 74 in other known methods, such as a snap fit, as will be seen by those of ordinary skill in the art. The second base plate 72 is likewise attached to the cover 74 via a threaded fastener 80 extending through a mounting hole 82 in the second base plate 72 and into a receiving hole (not shown) in the cover 74. The second base plate 72 further includes side tabs 84 that can extend into receiving holes (not visible) in the cover 74 as well. The cover 74 includes a battery compartment 86 in which the four AA batteries 22 are mounted and connected as described above.

The first base plate 70 can include at least two mounting pins 88, 89 on which a first circuit board 90 can be located and mounted. An electronic port 92 is mounted on the circuit board 90, and power from the batteries 22 can be transferred to the first circuit board 90 through a cable 94 to the port 92 (see FIG. 7). The first circuit board 90 can include a second electronic port 96 that can receive uninterrupted line power if the end user desires to install the latch system 10 in this manner. A second circuit board 91 is in communication with the first circuit board 90 and is disposed perpendicularly to it.

The first circuit board 90 and the second circuit board 91 can contain various electronic components that assist in the control of the main housing 12. For instance, the first circuit board 90 can include a microprocessor or other controller 93 and be operatively connected to a wireless reader 98 for wirelessly receiving a control signal such as the user's credentials to open the main housing 12. In the disclosed embodiment, the wireless reader system 98 includes an RFID antenna 100 that loops around the perimeter of the second circuit board 91 and an RFID chip 102 disposed on the first circuit board 90. And, as best seen in FIG. 7A, the wireless reader system 98 further includes a BLE chip 103 disposed on a back side of the second circuit board 91 (note that the RFID antenna 100 and other features on the first and second circuit board 90, 91 are not shown in FIG. 7A for clarity purposes). The microprocessor 93 can, in part, control the operation of an actuating device 104 in response to the control signal. The microprocessor 93, for instance, may be operatively connected to a memory (not shown) that includes a database of access codes. The first circuit board 90 may further be coupled to a capacitive sensor 106 disposed on the second circuit board 91 for aiding in extending the battery life, as will be described below. Although an RFID wireless system and BLE chip 103 are shown, either or both can be used to wirelessly receive a user's credentials, and other wireless systems, either alternatively or in combination, can be used, including Bluetooth and NFC.

The actuating device 104 includes an electric motor 108 disposed in a motor housing 110 formed in the first base plate 70. The electric motor 108 includes a series of reducing gears 112 and an output shaft 114. As is known, when the electric motor 108 is energized via the microprocessor 93, the electric motor 108 will rotate the output shaft 114 through the series of reducing gears 112.

The actuating device 104 further includes a three-position rotating cam 116 disposed on the output shaft 114. The cam 116 has a cam surface 118 defined by a pair of inclines 120, each separated by an intermediate step 122. Although a cam surface 118 having two inclines 120 and two intermediate steps 122 are shown in the figures herein, a single incline 120, with a single intermediate step 122, can be used.

The cam 116 has a recess that can have the same cross section as the output shaft 114 and can receive the output shaft 114 such that the output shaft 114 rotates the cam 116 during normal operation. In one example, the recess and the output shaft 114 may have non-circular cross sections such that relative rotation between the output shaft 114 and the cam 116 is prevented. The cam 116 further includes a cylinder 124 extending away from the direction of the electric motor 108.

Finally, the actuating device 104 includes a plunger 126 having a cylindrical recess that is rotatably mounted on the cylinder 124 of the rotating cam 116. The plunger 126 serves as the follower to the rotating cam 116 and has a follower surface 128 that has the same construction as the cam surface 118—two inclined surfaces 130 and two intermediate steps 132. As will be described in more detail below, rotation of the cam 116 will cause lateral translation of the plunger 126 to and between three separate working positions.

The plunger 126 further includes a shaft portion 134 that has a non-circular cross section and is received at least in part within a plunger guideway 136 of the first base plate 70. The plunger 126 can translate laterally in the plunger guideway 136, but plunger guideway 136 prevents the plunger 126 from rotating relative to the first base plate 70. In the illustrated example, the shaft portion 134 and the plunger guideway 136 are rectangular in cross section. Extending off a side of the shaft portion 112 is a sensor target 138. The sensor target 138 interacts with a first proximity switch 140 and a second proximity switch 141 mounted to the first circuit board 90 to provide instant feedback to the microprocessor 93 regarding the position of the plunger 126. Other actuating devices capable of outputting three positions can be used, including, for example, an electric motor connected to a rack and pinion gear set, a solenoid or other electrically operated actuator, and the like.

An actuating lever 142 is pivotably mounted to the first base plate 70 on a lever boss 144 and pivots about the lever boss 144. The actuating lever 142 has a plunger end 146 that contacts the plunger 126 and an actuating end 148 that is opposite the plunger end 146. A lever spring 150 is further mounted on the lever boss 144 and interacts with the actuating lever 142 to bias the actuating lever 142 in the clockwise direction as seen in FIG. 8 about the lever boss 144. Accordingly, when the plunger 126 is in the extended position away from the electric motor 108, the actuating lever 142 is pivoted counterclockwise by the plunger 126. But when the plunger 126 retracts, the lever spring 150 biases the actuating lever 142 in the clockwise direction.

The first base plate 70 further includes a latch boss 152 on which are rotatably mounted a latch hook 154 and a latch hook catch 156 (or simply "catch" 156). The latch hook 154 includes a first leg 158, a second leg 160, and U-shaped recess 162 between the first and second legs 158, 160 that is sized and shaped to receive the latch rod 56. When the latch hook 154 is rotated counterclockwise, such that the U-shaped recess 162 is accessible via a housing recess 164 in the main housing 62, the latch hook 154 is in the open position. When the latch hook 154 is rotated clockwise, such that the first leg 158 of the latch hook 154 blocks access to the U-shaped recess 162 through the housing recess 164, the latch hook 154 is in the closed position. The latch hook 154 further includes a flange 166 that extends radially outwardly and has a first end 168 and a second end 170.

A detent spring 172 is rotatably mounted to a detent spring boss 174 in the first base plate 70 on one end, and it is attached to the second leg 160 of the latch hook 154 on the other end. The detent spring 172 is a bi-stable mechanism biasing the latch hook 154 into either the open position or the closed position. The first end 168 of the flange 166 can interact with an abutment face 176 of the actuating lever 142 to preclude rotation of the latch hook 154 and maintain the latch hook 154 in the closed position.

The catch 156 is also rotatably disposed on the latch boss 152 and rotates about the same axis of rotation as the latch 154. The catch 156 also includes a flange 178 extending radially outward with a first end 180 that interacts with the abutment face 176 of the actuating lever 142. But the flange 178 on the catch 156 also includes an annular upstanding lug 182 that interacts with the second end 170 of the flange 166 of the latch hook 154. Moreover, a catch spring 184 is attached to the lug 182 on one end and to the mounting pin 88 on the other to bias the catch 156 in the counterclockwise direction. Accordingly, when the actuating lever 142 is rotated away from the catch 156, and the abutment face 176 no longer engages the first end 180 of the catch flange 178, the catch spring 184 rotates the catch 156 in a counterclockwise direction, and the lug 182 acts on the second end 170 of the latch hook's flange 166 and transfers the rotational force to the latch hook 154, thereby rotating the latch hook 154 to the open position. The force of the catch spring 184 is greater that the force of the detent spring 172, and so when the catch 156 is acting on the latch hook 154, the latch hook 154 will be rotated to the open position.

The latch system 10 further includes an indicator assembly 190 that can indicate to the user whether the main housing 12 is in the locked position or an unlocked position. An indicator lever 192 is rotatably mounted to an indicator boss 194 formed in the first base plate 70. A push rod 196 is attached to one end of the indicator lever 192, and a push block 198 is attached to the other end of the push rod 196. An indicator spring 200 biases the indicator lever 192 in the clockwise direction. The indicator lever 192 further includes a finger 202 that interacts with the abutment face 176 of the actuating lever 142, such that when the actuating lever 142 is rotated clockwise, corresponding to the latch system 10 being in the locked position, the abutment face 176 will rotate away from the finger 202 of the indicator lever 192, and the indicator lever 192 will rotate clockwise under the force of the indicator spring 200, from an unlocked indication position to a locked indication position, thereby pushing the push rod 196 and the push block 198.

Figure 9:
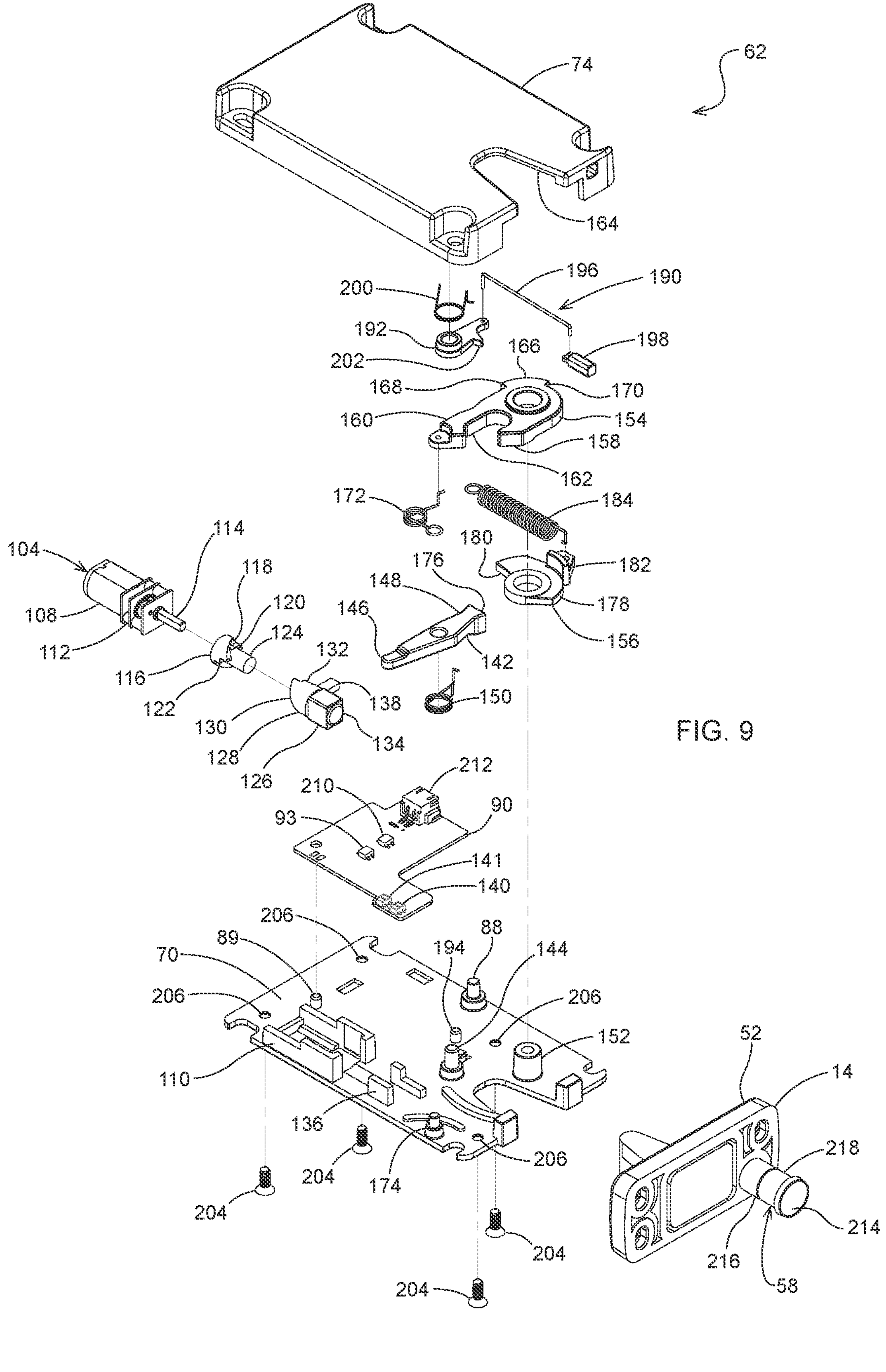
FIG. 9 is an exploded perspective view of the latch system of FIG. 6.

Referring now to FIG. 9, an exploded view of the main housing 62 and strike 14 of FIG. 6 is shown. In general, the mechanical operation of the main housing 62 is the same as the mechanical operation of the main housing 12, and like elements in the two embodiments have the same reference number. As noted above, however, the main housing 62 has a height H1 that is less than the height H of the main housing 12. This is achieved by including a Bluetooth or BLE chip 210 on the first circuit board 90 that receives control signals from a user and eliminating the RF antenna 100. In this example, therefore, the BLE chip 210 will receive credentials from a user and transmit those credentials to the microprocessor for comparison with the stored access codes to determine if the user's credentials are sufficient to open or close the lock. Moreover, the capacitive sensor 106 has also been eliminated in this example. The loss of power-saving features, such as the capacitive sensor 106, can be mitigated by providing the main housing 62 with line power through port 212.

As further seen in FIG. 9, extending from the back side of the mounting plate 52 of the strike 14 is the indicator cylinder 58 that can extend through the wall of an enclosure such that an indicator window 214 is visible to the user. The indicator cylinder 58 includes a base 216, a housing 218 coupled to the base 216, and the window 214 coupled to the housing 218. As will be discussed below, the push block 198 will selectively actuate an assembly within the indicator cylinder 58 by its forward and rearward movement to indicate to the user through the window 214 whether the main housing 62 is in the locked position or an unlocked position.

The control of main housing 12 of latch system 10 will now be disclosed. The control of main housing 32, disclosed in FIGS. 3 and 4, is the same as housing 12. The main housing 12 can be in sleep mode when not in use. During sleep mode, the RFID antenna 100 and the BLE chip 103 do not emit interrogation signals, which will save battery power. A user can place his or her hand near the capacitive sensor 106, which will trigger the capacitive sensor 106, and will signal the microprocessor 93 to exit sleep mode. Then the RFID antenna 100 and BLE chip 103 emit interrogation signals and can read any nearby RFID tag or Mobile ID of a user for credentials stored thereon. Other proximity sensors known in the art, such as photoelectric sensors, accelerometers, IR sensors, ultra-sound sensors, optical sensors, pressure sensors, eddy-current sensors, and the like can be used.

If the access code read through the RFID antenna 100 or the BLE chip 103 matches an access code stored in memory and other criteria and operating parameters, the microprocessor 93 can signal the actuating device 104. Finally, the first circuit board 90 can include a bus for communicating control signals to the electric motor 108. Those of ordinary skill in the art will understand that the configuration of the first circuit board 90 is not limited to any particular hardware, software, or control architecture or configuration. The systems and methods described may be implemented by one or more general purpose computer or custom computing devices adapted in any suitable manner to provide the desired functionality.

The control of the main housing 62 disclosed in FIG. 9 is similar, but based on the minimized height H1, do not include the capacitive sensor or RFID antenna. Instead, the main housing 62 includes a BLE chip 210 mounted to the circuit board, and a user can provide his or her credentials to the main housing 62 via an app on a smart phone or tablet, for instance. Further, the user does not need to place his or her hand near the latch system itself to exit sleep mode, as the BLE chip 210 can always be actively scanning, or the microprocessor 93 can limit the activity of the BLE chip 210 to certain times of day. The control of main housing 42, disclosed in FIG. 5, is the same as the control of housing 62.

Referring now to FIGS. 10-14, the mechanical operation of the main housing 62 will now be discussed. As will be understood, although the mechanical operation of the main housing 62 is described herein, the mechanical operation of all other embodiments described herein is the same.

Figure 10:
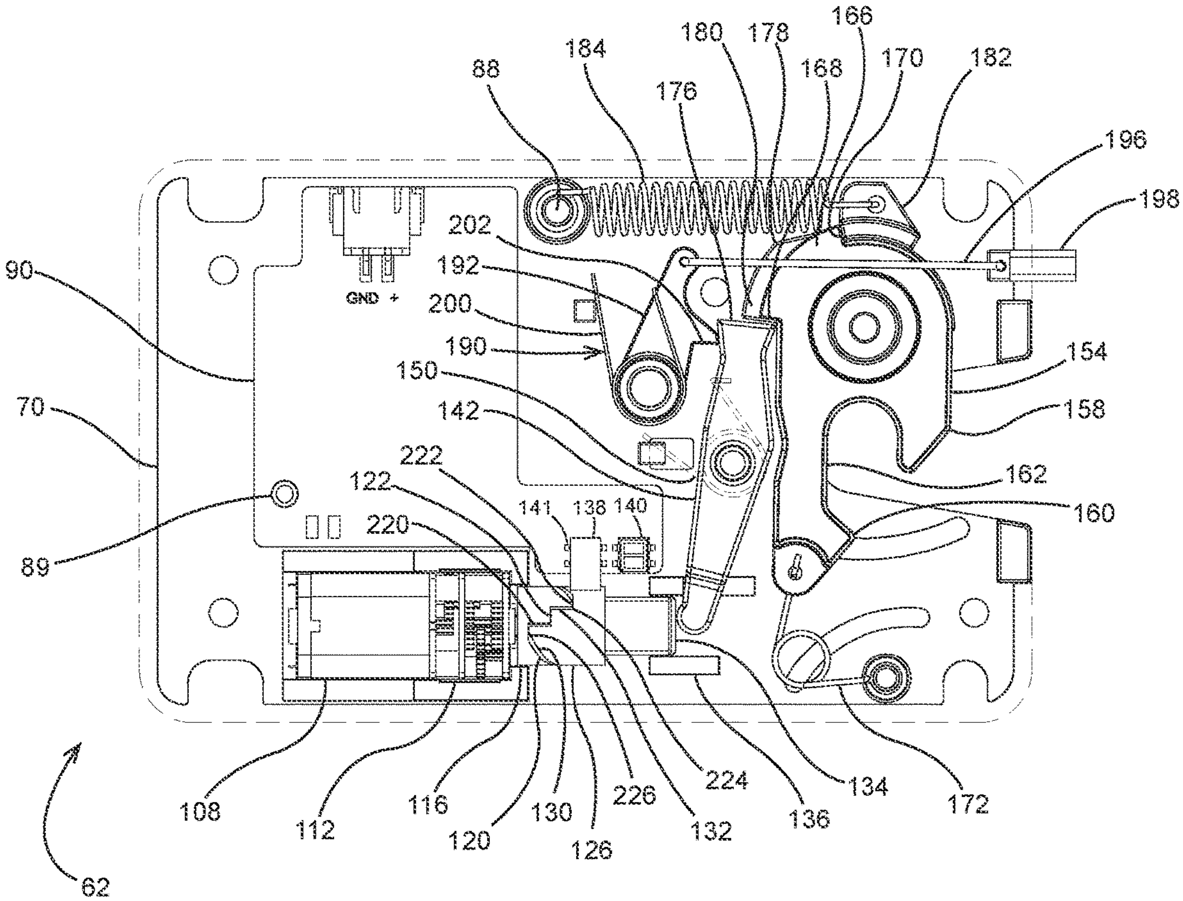
FIG. 10 is a plan view of the latch system of FIG. 6 with the actuating lever in the locked position and the latch hook in the closed position.

FIG. 10 depicts the main housing 62 in the closed and locked position. As previously discussed, and as can be more clearly seen in FIG. 10, the rotating cam 116 has an inclined cam surface 120 having a base 220, the intermediate step 122, and culminating in a tip 222. Likewise, the plunger 126 has a coordinating inclined cam surface 130, with a base

224, an intermediate step 132, and a culminating in a tip 226. In FIG. 10, the plunger tip 226 is disposed in the cam base 220, the plunger intermediate step 132 is disposed on the cam intermediate step 122, and the plunger base 224 is disposed on the cam tip 222. At this point, the sensor target 138 engages the second proximity switch 141, thereby informing the microprocessor 93 that the plunger 126 is in the fully retracted position.

As noted previously, the lever spring 150 of the actuating lever 142 biases the actuating lever 142 in a counterclockwise direction, and the catch 156 is biased in a counterclockwise direction under the force of the catch spring 184. The first end 180 of the flange 178 of the catch 156 engages the abutment face 176 of the actuating lever 142, and the lug 182 of the catch 156 engages the second end 170 of the flange 166 of the latch hook 154, thereby biasing the latch hook 154 in the counterclockwise direction, such that the first end 168 of the flange 166 of the latch hook 154 engages the abutment face 176 of the actuating lever 142. In this position, the abutment face 176 of the actuating lever 142 prevents the latch hook 154 from rotating counterclockwise, and therefore locks the main housing 62 in the closed position.

With the actuating lever 142 pivoted clockwise as shown in FIG. 10, the abutment face 176 does not contact the finger 202 of the indicator lever 192 and therefore does not impede rotational motion of the indicator lever 192. The indicator lever 192 rotates clockwise, and the push rod 196 pushes the push block 198 forward and out of the main housing 62 to interact with the indicator cylinder 58 of the strike 14, as will be more fully described below.

Figure 11:
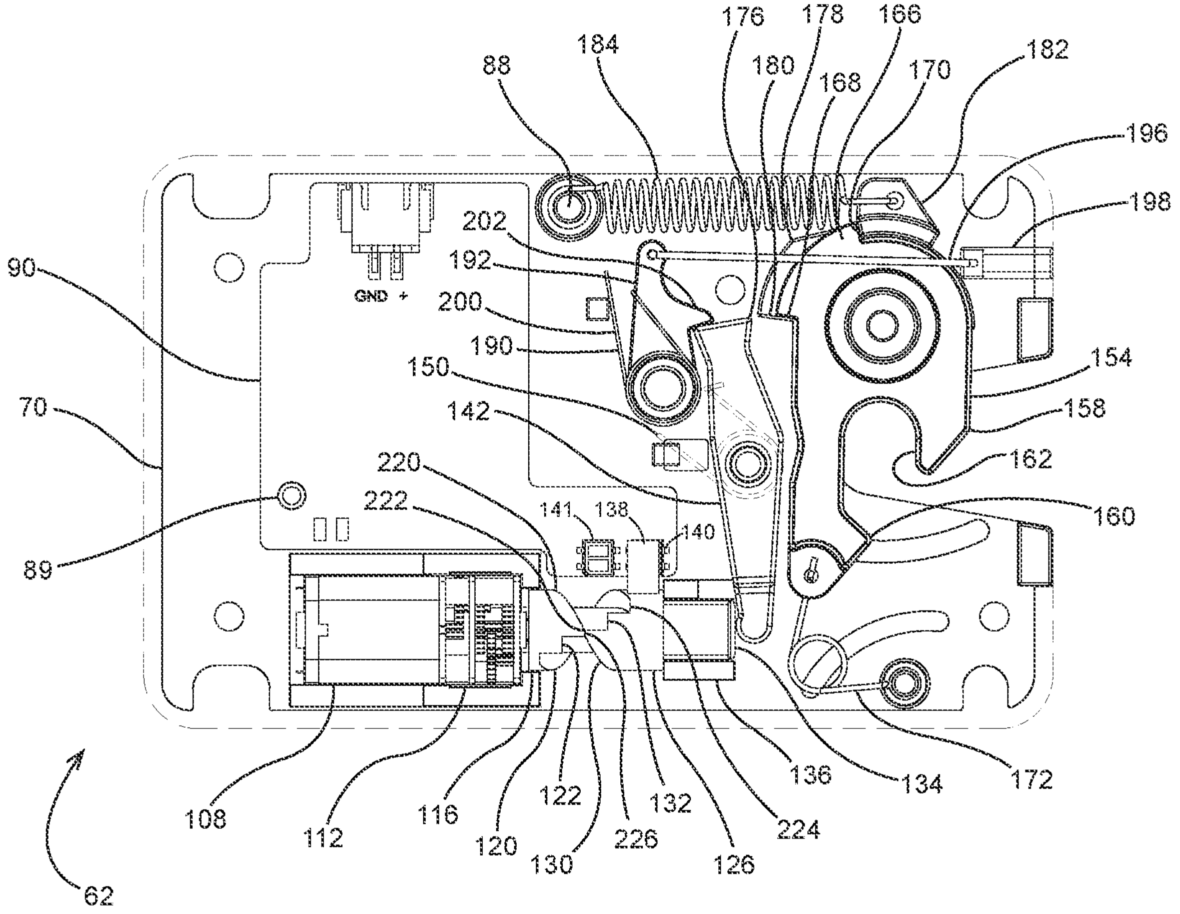
FIG. 11 is a plan view of the latch system of FIG. 6 with the actuating lever in a first unlocked position, and the latch hook in the closed position prior to being biased open.

Referring now to FIG. 11, the main housing 62 is disclosed when moved into a first unlocked position, but the instant before the latch hook 154 moves from the closed position to the open position. Here, the electric motor 108 has rotated the cam 116 approximately ½ turn, such that the tip 222 of the cam 116 now bears against the tip 226 of the plunger 126, and the cam 116 has translated the plunger 126 laterally forward. The sensor target 138 now engages the first proximity switch 140, thereby indicating to the microprocessor 93 that the plunger 126 is in the fully extended position.

The actuating lever 142 has pivoted counterclockwise, thereby forcing the indicator lever 192 to likewise rotate counterclockwise and pull the push block 198 back into the main housing 62. The abutment face 176 of the actuating lever 142 no longer engages either the flange 166 of the latch hook 154 or the flange 178 of the catch 156.

Figure 12:
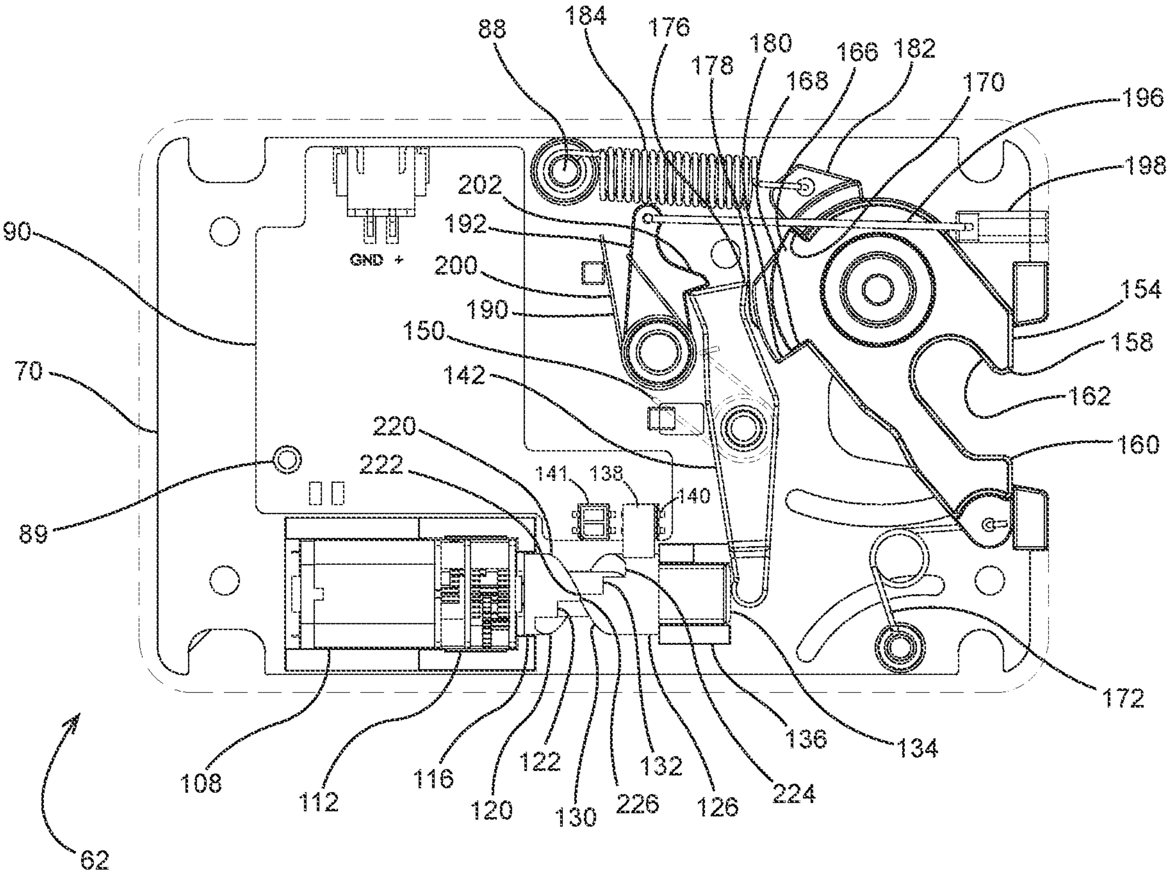
FIG. 12 is a plan view of the latch system of FIG. 6 with the actuating lever in the first unlocked position and the latch hook biased to an open position.

FIG. 12 similarly depicts the housing 62 in the first unlocked position, but further depicts the latch hook 154 having moved to the open position. The catch spring 184 pulls the catch 156 in a counterclockwise direction, and the lug 182 of the catch 156, bearing against the second end 170 of the flange 166 of the latch hook 154, pulls the latch hook 154 likewise in the counterclockwise direction, thereby biasing the latch hook 154 to the open position when the actuating lever 142 is in the first unlocked position.

Figure 13:
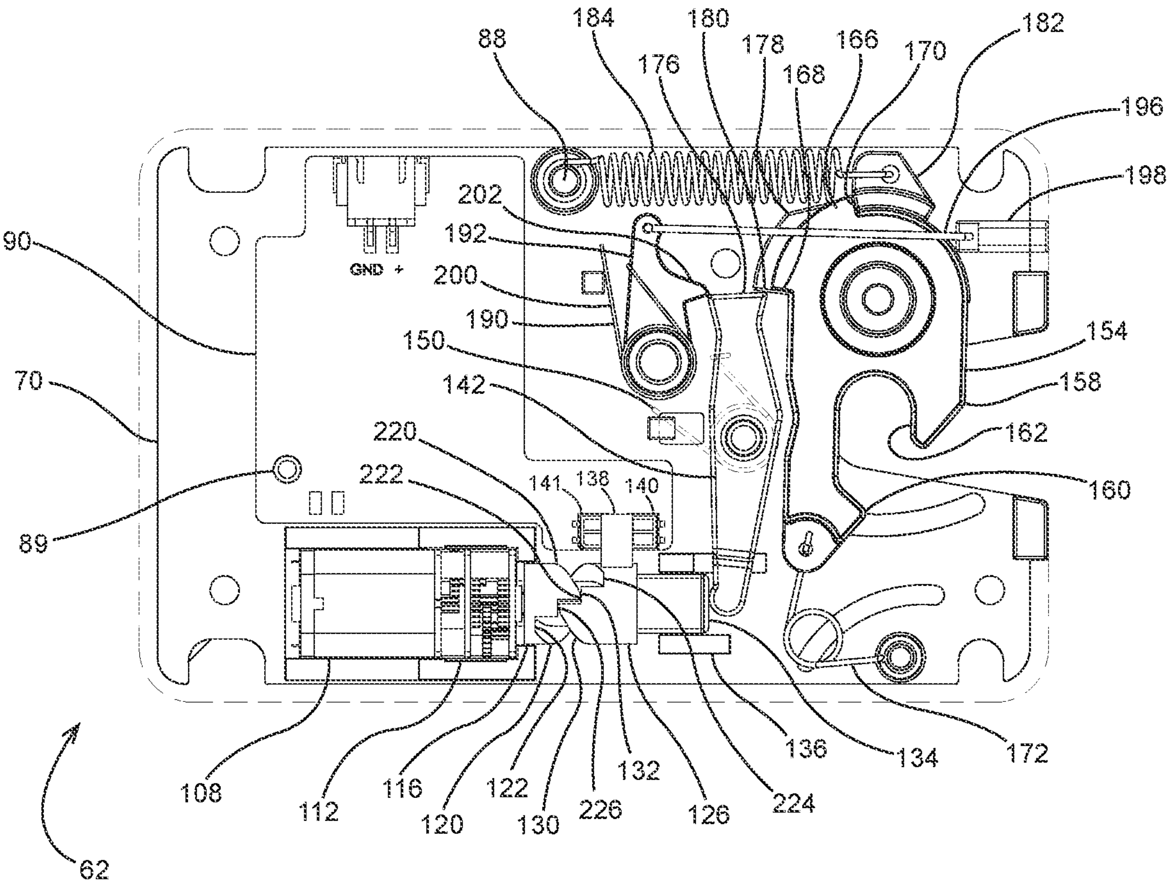
FIG. 13 is a plan view of the latch system of FIG. 6 with the actuating lever in a second unlocked position and the latch hook in the closed position.
Figure 14:
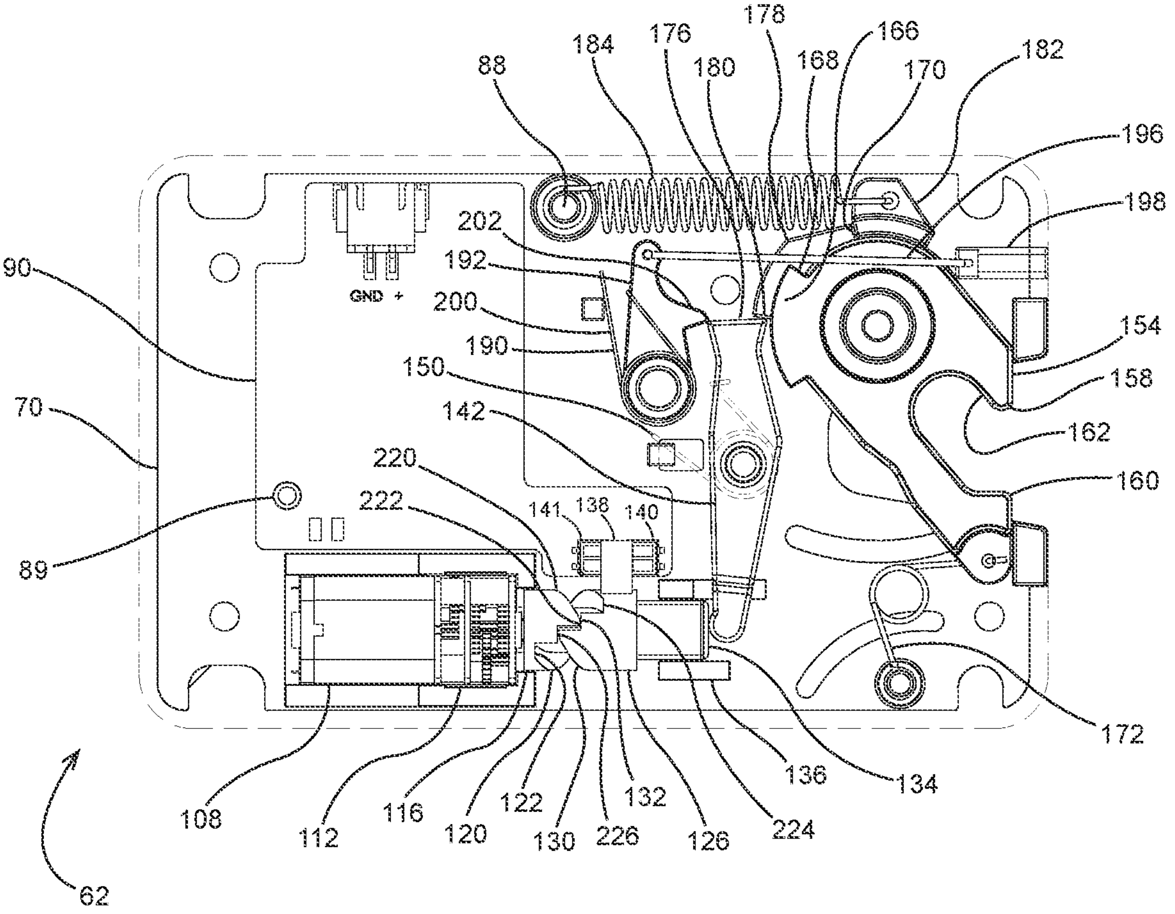
FIG. 14 is a plan view of the latch system of FIG. 6 with the actuating lever in the second unlocked position and the latch hook in the open position.

FIGS. 13 and 14 depict a third position of the latch assembly 60 in the second unlocked position. Here, the electric motor 108 has rotated the cam 116 slightly past the position indicated in FIGS. 11 and 12. The tip 222 of the cam 116 bears against the intermediate step 132 of the plunger 126, and the tip 226 of the plunger 126 bears against the intermediate step 122 of the cam 116. The sensor target 138 is disposed in a position between the first proximity sensor 140 and the second proximity sensor 141, thereby engaging neither. When neither switch 140, 141 is engaged, the microprocessor 93 is configured to understand that the plunger 126 is in an intermediate position.

In this position, the abutment face 176 of the actuating lever 142 engages the finger 202 of the indicator lever 192 (again, the unlocked indication position), thus maintaining the push block 198 within the main housing 62. Moreover, because the flange 178 of the catch 156 extends radially outward further than the flange 166 of the latch hook 154, the abutment face 176 engages the first end 180 of the catch flange 178, but it does not engage the first end 168 of the latch hook flange 166. Thus, the abutment face 176 of the actuating lever 142 locks the catch 156 in place, but it does not interfere with rotational motion of the latch hook 154. As shown in FIG. 13, therefore, the latch hook 154 can rotate into the closed position, while the latch assembly 60 is in the unlocked state, and the bi-stable detent spring 172 will maintain the latch hook 154 in the closed position.

As shown in FIG. 14, however, a user may open the door or drawer, and the latch hook 154 is free to rotate counterclockwise to the open position. The bi-stable detent spring 172 will then hold the latch hook 154 in the open position. Again, the user may freely move the latch hook 154 between the open and closed position (i.e., open and close the door), and the detent spring 172 will maintain the position of the latch hook 154 to the open and closed positions shown in FIGS. 13 and 14.

Figure 15:
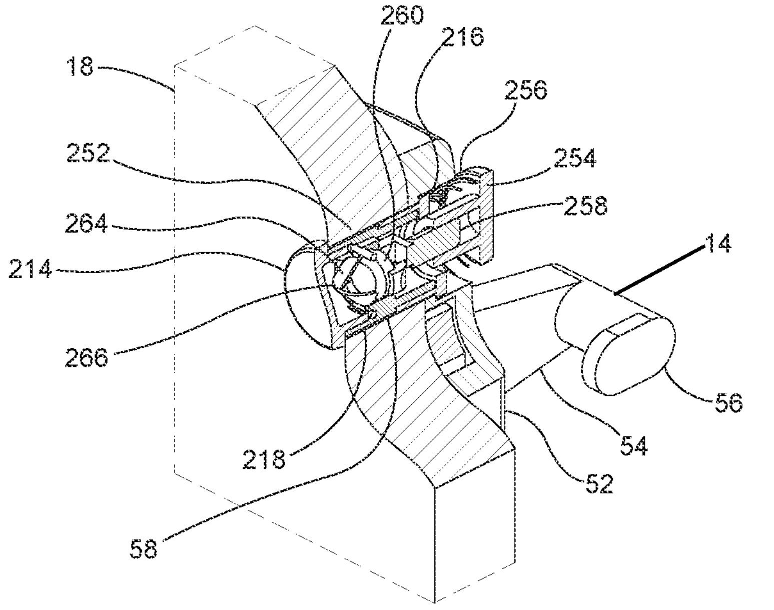
FIG. 15 is a perspective view in partial cut-away of an enclosure panel with a strike and indicator mounted to the panel, the indicator providing an unlocked indication.
Figure 16:
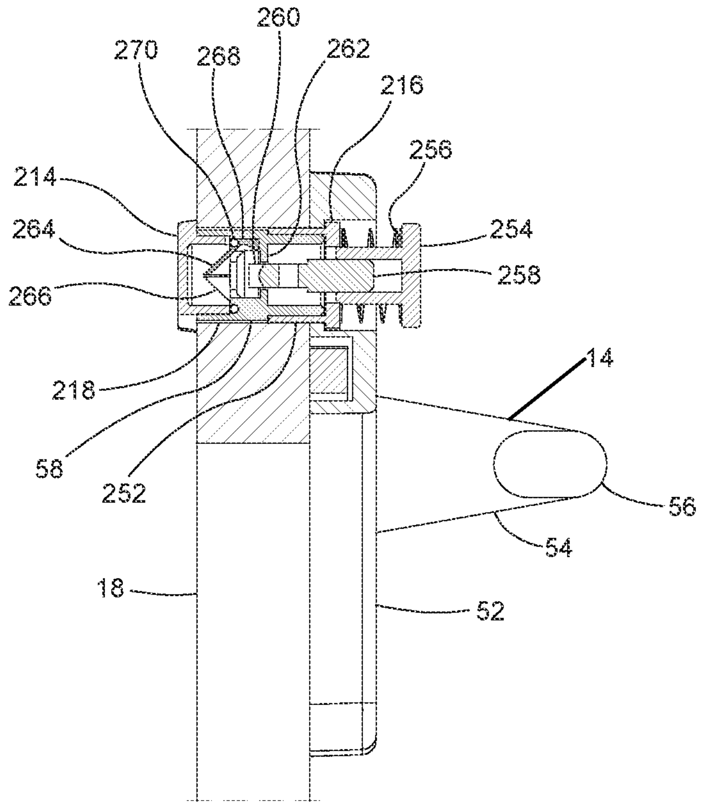
FIG. 16 is a side view of the strike and panel as seen in FIG. 15.

Referring now to FIGS. 15 and 16, the strike 14 is detailed with the indicator cylinder 58 disposed in the enclosure panel 18 indicating that the main housing 62 is in an unlocked position. Again, while the indicator cylinder 58 is described with respect to the main housing 62, the indicator cylinder 58 is equally useful with any of the main housings disclosed herein and is further not limited to use with the latch systems disclosed herein. The mounting plate 52, the latch rod 56, and the upright 54 spacing the latch rod 56 from the mounting plate 52 are seen. Moreover, the latch rod 56 is disposed generally parallel to the mounting plate 52, and is constructed to engage the U-shaped recess 162 in the latch hook 154 as is known in the art.

The base 216, the housing 218, and the window 214 of the indicator cylinder 58 are depicted as mounted to the enclosure panel 18 such as a door or drawer face plate by extending through a hole 252 formed in the panel 18. The cylinder 58 further includes a plunger 254 slidable within the base 216 and biased via a coil spring 256 away from the window 214. The plunger 254 includes a pin 258 and a head 260 disposed on the pin 258. The head 260 bears against a narrowed section 262 of the housing 218 to provide a positive stop for the retraction of the plunger 254 under the force of the coil spring 256.

The indicator cylinder 58 further includes a cap 264 that is split into two sections, each section being a conical section 266 rotationally hinged at one end, and each section including a leg 268 extending downward from the hinge 270. The cap 264 is colored green in this example, such that when the main housing 62 is in either unlocked position, a user can see the green cap 264 through the window 214 and know that the main housing 62 is unlocked.

Figure 17:
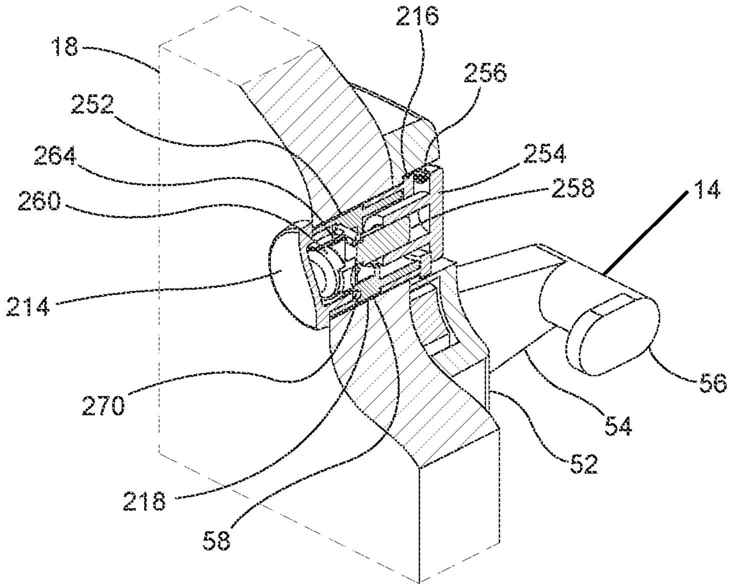
FIG. 17 is a perspective view in partial cut-away of the enclosure panel, the strike and the indicator of FIG. 15, with the indicator providing a locked indication.
Figure 18:
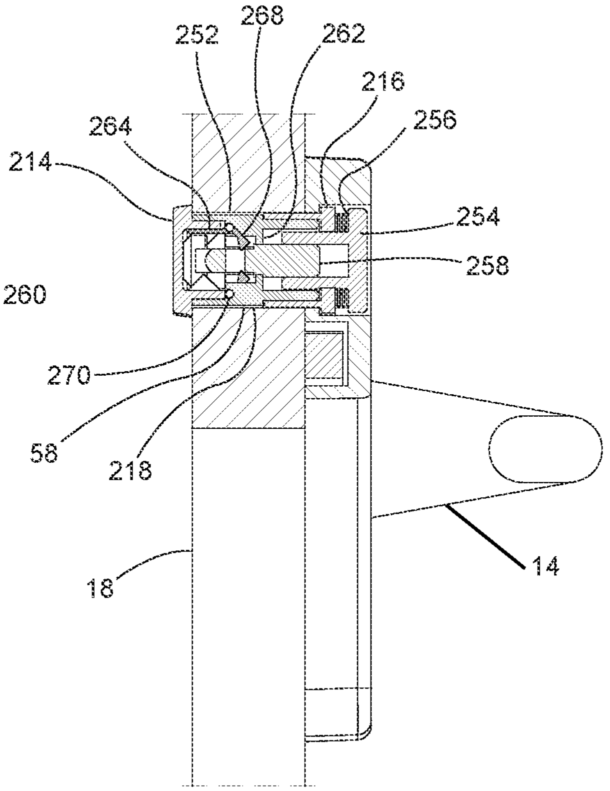
FIG. 18 is a side view of the strike and panel as seen in FIG. 17.

Referring now to FIGS. 17 and 18, the indicator cylinder 58 is shown where the housing 62 is in the locked position and providing the user a locked indication. The push block 198 has pushed the plunger 254 into the housing 218, thereby pushing the pin 258 and the head 260 toward the window 214. The head 260 forces the two conical sections 266 of the cap 264 to pivot about their respective hinges 270 away from each other, and the head 260 is adjacent the window 214. In this example, the head 260 is colored a bright red, and the user can see the red-colored head 260 through the window 214. Because the coloration viewable through the window 214 is now red instead of green, the user is aware that the latch assembly 60 is in the locked position. Other contrasting colorations, such as black and white, could be used.

When the main housing 62 is returned to the unlocked position, the push block 198 retracts, the coil spring 256 forces the plunger 254 to the position shown in FIGS. 15 and 16, and the head 260, retracting back into the housing 218, bears against the legs 268 of the cap 264, thereby positively forcing the conical-shaped portions 266 of the cap 264 to come together.

The main housing 62 can be set in different configurations. In the assigned use mode, the main housing 62 will start in the locked position as shown in FIG. 10. In other words, the plunger 126 is fully retracted and the abutment face 176 of the actuating lever 142 prevents rotation of the latch hook 154. After the user successfully presents her credentials, the electric motor 108 rotates the cam 116 until the plunger 126 is fully extended, as shown in FIG. 11, and the force of the catch spring 184 will pull the latch hook 154 to the open position as shown in FIG. 12. When the user presents her same credentials again, the electric motor 108 will rotate the cam 116, first to the intermediate position shown in FIG. 13 where the intermediate steps 122, 132 bear against each other, and then continue on back to the fully retracted position shown in FIG. 10. The main housing 62 will again be in the locked position as described above.

The main housing 62 can also be placed in a shared use mode. In this mode, the main housing 62 can start in the unlocked mode shown in FIGS. 13 and 14. Here, a user can open and close the locker door, and the door will stay either open or closed, respectively, as described above. When the user provides his credentials, the electric motor 108 then rotates the cam 116 to the locked position of FIG. 10. The user can then go use, for example, the health club facilities. When the user returns, he provides the same credentials, and the electric motor 108 rotates first to the unlocked position in FIG. 11, where it allows the catch spring 184 to pull the latch hook 154 into the open position shown in FIG. 12. The electric motor 108 then automatically continues to rotate the cam 116 to the intermediate position shown in FIGS. 13 and 14. Accordingly, in the shared use mode, when the latch assembly 60 in is the unlocked position, the user can open and close the enclosure, and the door and or drawer will remain open or closed.

The two operating configurations can be programmed into the microprocessor 93 and the associated memory. Selection of the desired operating configurations can be set via control signals to the latch system 60 to be received by the microprocessor as discussed above. The control signals can be sent via an application on a cellular telephone, a program on a personal computer, or other known method.

Figure 19:
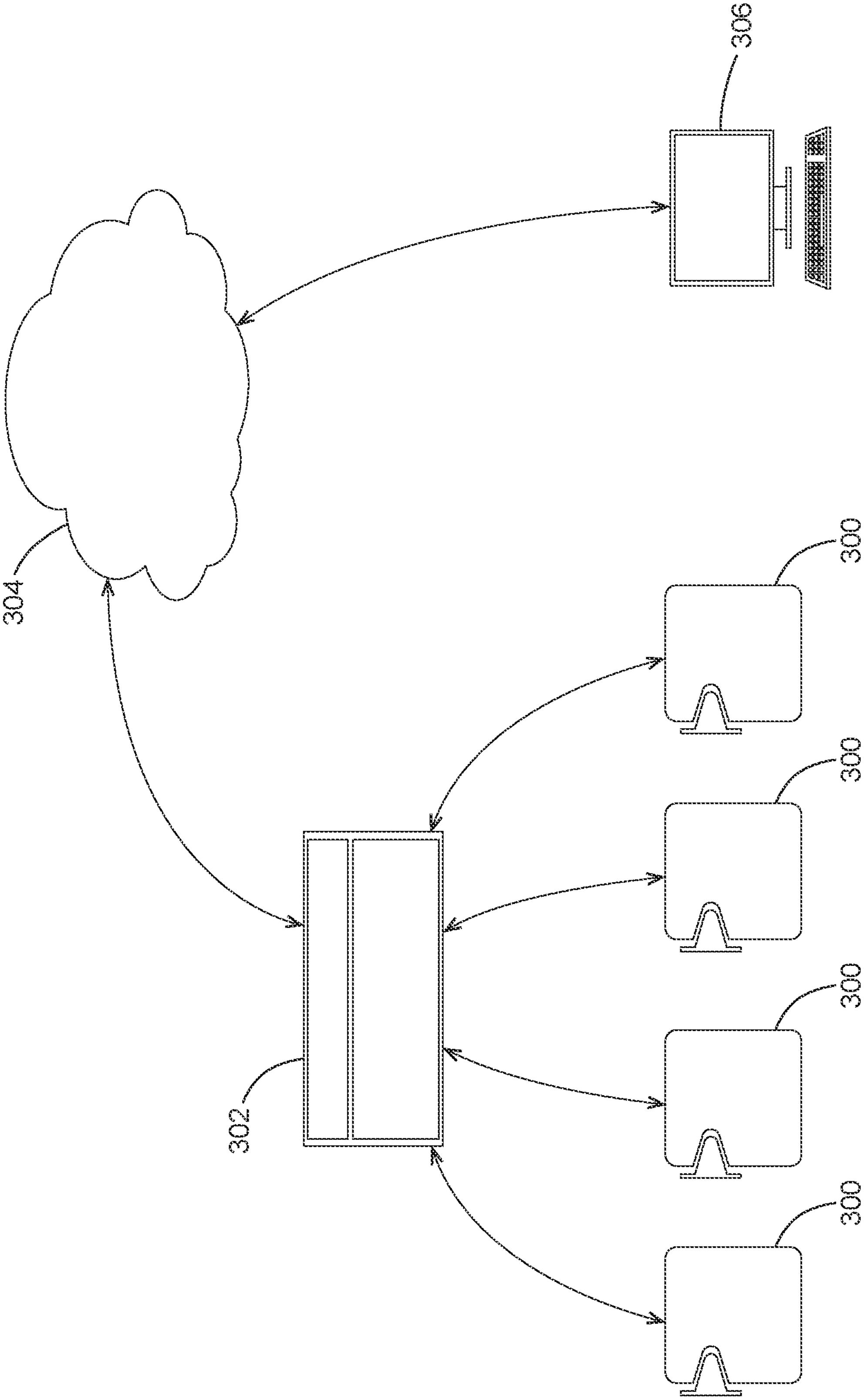
FIG. 19 is a schematic of several latch systems wirelessly connected to a personal computer through a controller and cloud-based server.

Referring now to FIG. 19, a system of latch systems 300 and their control is depicted. The latch systems 300 can be, for example, constructed as in any of the foregoing embodiments. As discussed earlier, each latch assembly 300 can include a BLE chip, such as BLE chip 103 of FIG. 7*a*, or BLE chip 210 of FIG. 9, and these BLE chips 103, 210 can be configured to wirelessly receive credentials from users. Moreover, the BLC chips 103, 210 can be configured to connect wirelessly to a local controller 302. Although BLE chips are discussed, other structures and methods for wireless communication to the controller 302 are known in the art and can be implemented, such as WiFi or Bluetooth. Moreover, a fully wired connection to the controller 302 is also possible.

The controller 302 can set the credentials for each latch system 300 that will allow operation of the latch systems 300 via the credential input process as described above. The controller 302 can limit the operability of the credentials by allowing operation at only certain times of day, by allowing certain users to operate some locks but not others, by allowing the user's credentials to only be operable at certain times of day, a combination of the foregoing, and so forth. As noted, the controller 302 can set the latch systems 300 in shared use mode or assigned use mode. The latch systems 300 can also be programmed such that the BLE chips transmit information to the controller 302 regarding time and date of opening and closing of the lock, identification of user in each instance, remaining battery power, and the like. In some examples, the latch system 300 can include a sensor to determine if door 18 is open or closed. Such sensor can be magnetic, optical, or the like placed on the exterior of the housing 300 and adjacent the door 18. In such a configuration, this sensor can help determine forced entry of the door 18, i.e., the housing 12 remains in the locked position, but the door 18 is forced open. When a forced entry is detected, the latch system 300 can signal the controller 302. The controller 302 can be connected to an audible alarm, which can be triggered upon receipt of a forced open signal.

The controller 302 can control further aspects to the functionality of the latch systems 300. Accordingly, the controller 302 can direct any of the latch systems 300 to shift between the locked position, the first unlocked position, and the second unlocked position by communicating with the microprocessors. In further functional aspects for the examples disclosed in FIGS. 1-4, 7, and 8, the controller 302 can set one or more latch systems 300 in a locked position, but require no credentials to shift the latch system 300 to an unlocked position. Instead, a user can open the latch system 300 by simply activating the capacitive sensor 106. Thus, simply by placing his or her hand adjacent to the latch system 300, the latch system will shift from the locked position to an unlocked position. Other functionality can be built into the system such as that described in U.S. Patent Application No. 2018/0033227, the disclosure of which is incorporated by reference herein in full.

The controller 302 itself can be connected to a cloud-based server 304 via an internet connection. While only one controller 302, and one set of latch systems 300, is depicted in FIG. 19, it is understood that numerous controllers 302, each controlling several latch systems 300, can be connected to the cloud-based server 304. As is further depicted in FIG. 19, a personal computer 306 is connected to the cloud-based server 304 via the internet. While a personal computer 306 is depicted in FIG. 19, any computing device, such as a tablet or a smart phone, can also be used. Moreover, although a cloud-based server is disclosed, other servers such as on premise servers can also be used.

Here, a manager can control all functionality of the latch systems 300, including setting credentials for every latch system 300 in the system, from any computer 306 connected to the internet. For example, via an application stored on the personal computer 306 or via a website, the user can communicate with the cloud-based server 304 to shift the latch systems 300 between the locked position, the first unlocked position, and the second unlocked position. The user can further update the credentials, and the cloud-based server 304 will communicate, in turn, with the controller 302. The controller 302 can then communicate with the predetermined individual locks 300 to set the credentials and functionality as described above, such as determining which user is authorized to open which of the locks 300, and at what times. Control of the locking devices may incorporate concepts disclosed in U.S. Pat. No. 9,672,673, which is incorporated in its entirety herein by reference. Moreover, the controllers 302 can communicate with the cloud-based server 304 to provide it with any of the lock statuses discussed above, and the user, using the personal computer 306, can review any and all of the data via the aforementioned websites or applications.

In a further aspect reducing power consumption, upon actuation of the capacitive sensor 106, the microprocessor 93 of the latch system 300 can initiate an interrogation of the controller 302 for any updates to the credentials of authorized tags. Upon receipt of the updated list of credentials (or lack of updates), the microprocessor 93 will authorize (or will not authorize) the opening of the latch system 300. Such information can be downloaded from the controller 302 to the latch system 300 near instantaneously, occurring fully in the background, and an end user is not aware of the data transfer. Further, by limiting updates to the list of credentials to only the times that the capacitive sensor 106 is actuated, communications between the latch systems 300 and the controller 302 are minimized, rather than having constant polling by the latch systems 300 or multiple pushes from the controller 302 to the latch systems 300.

In the system disclosed in FIG. 19, power consumption can be further reduced. As discussed above, a manager can control operation of the latch systems 300 by way of the personal computer 306. In particular, the manager can control the capacitive sensors 106 and/or BLE chips 103, 210 of the latch systems 300. Thus, the capacitive sensors 106 and BLE chips 103, 210 can be limited to only be operable at certain times of day or certain days of the week. Further, it may be desirable for certain latch systems 300 to only be operable when specifically OK'd by a manager. In this instance, the capacitive sensor 106 and/or BLE chips 103, 210 can be inoperable unless and until a manager makes them operable by a command at the personal computer 306. Only then, for example, will an end user's hand near the lock 300 activate the capacitive sensor 106 and allow the RFID reader to become active.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A latch system, comprising:

a housing;

a controller disposed in the housing and configured to selectively place the latch system in a first operating mode and a second operating mode;

an actuator disposed within the housing and electronically coupled to the controller, the actuator configured to have an output of at least three discrete positions;

an actuating lever operatively coupled to the actuator and pivotable between at least three discrete positions corresponding to the at least three discrete positions of the actuator, the at least three discrete positions of the actuating lever including a locked position, a first unlocked position, and a second unlocked position;

wherein in the first operating mode, the controller is configured to direct the actuator to pivot the actuating lever from the locked position and stop at the first unlocked position; and wherein in the second operating mode, the controller is configured to direct the actuator to pivot the actuating lever from the locked position and stop at the second unlocked position.

2. The latch system of claim 1, further comprising a latch hook disposed in the housing and rotatable between an open position and a closed position, the latch hook including a radially extending flange, the actuating lever including an abutment face, the abutment face engaging a first end of the flange and impeding rotation of the latch hook when the latch hook is in the closed position and the actuating lever is in the locked position.

3. The latch system of claim 2, further comprising a rotatable catch disposed in the housing and including a radially extending flange that extends radially further than the flange of the latch hook, wherein the abutment face engages the flange of the catch, but not the flange of the latch hook, in the second unlocked position.

4. The latch system of claim 3, further comprising a detent spring coupled to the latch hook and configured to bi-stably maintain the latch hook in either the open position or the closed position in the second unlocked position.

5. The latch system of claim 3, wherein the catch includes a lug that engages a second end of the latch hook flange, wherein in the first unlocked position the abutment face does not engage either the flange of the catch or the flange of the latch hook, and the lug biases the latch hook to the open position.

6. The latch system of claim 1, further comprising a wireless reader in communication with the controller.

7. The latch system of claim 6, the wireless reader configured to receive one or more of Bluetooth, NFC, RFID, or BLE control signals from a user, the controller adapted to receive the control signals from the wireless reader.

8. The latch system of claim 1, further comprising a capacitive sensor, wherein the latch system is configured to be in sleep mode until the capacitive sensor is actuated.

9. The latch system of claim 1, further comprising an external controller in communication with the controller disposed in the housing.

10. The latch system of claim 9, the external controller in wireless communication with the controller disposed in the housing.

11. The latch system of claim 9, the external controller configured to communicate with a cloud-based server.

12. A latch system, comprising:

a housing;

a controller disposed in the housing and configured to selectively place the latch system in a first operating mode and a second operating mode;

an actuator disposed within the housing and electronically coupled to the controller, the actuator configured to have an output of at least three discrete positions;

an actuating lever operatively coupled to the actuator and pivotable between at least three discrete positions corresponding to the at least three discrete positions of the actuator, the at least three discrete positions of the actuating lever including a locked position, a first unlocked position, and a second unlocked position; and a latch hook selectively shiftable between an open position and a closed position;

wherein in the first operating mode, the controller is configured to direct the actuator to pivot the actuating lever from the locked position and stop at the first unlocked position; and wherein in the second operating mode, the controller is configured to direct the actuator to pivot the actuating lever from the locked position and stop at the second unlocked position.

13. The latch system of claim 12, wherein in the first unlocked position, the latch hook is biased to the open position.

14. The latch system of claim 12, wherein in the second unlocked position, the latch hook is bi-stable relative to an open position and closed position.

15. A locking system for a cabinet, locker, drawer, or other furniture piece, the system including:

a lock disposed on an interior of a furniture piece, the lock including a member shiftable between a first position and a second position, the lock configured to place the member in the first position when the lock is locked, the lock further configured to place the member in the second position when the lock is unlocked; and an indicator disposed in a panel of the furniture piece and visible from external to the furniture piece, the indicator operatively coupled to the member, wherein when the member is in the first position, the indicator provides a locked indication, wherein when the member is in the second position, the indicator provides an unlocked indication;

the panel shiftable between an open position and a closed position, wherein when the panel is in the open position, the interior of the furniture piece is accessible;

wherein the indicator includes a profile configured to be disposed in the panel;

wherein the indicator further includes a first surface disposed within the profile visible when providing the unlocked indication, and a second surface disposed within the profile visible when providing the locked indication.

16. The locking system of claim 15, the indicator further including a window configured to be visible from an exterior of the panel.

17. The locking system of claim 16 further including a plunger disposed within the profile and biased by a plunger spring away from the direction of the window.

18. The locking system of claim 17, wherein when the lock is shifted from the unlocked position to the locked position, the member is configured to shift the plunger toward the window.

19. The locking system of claim 18, the plunger further comprising a head, the profile further comprising a cap, the head including the first surface, the cap including the second surface.

20. The locking system of claim 19, wherein when the member moves from the first position to the second position, the plunger is configured to push the head through the cap such that the cap rotates out of the path of the head.

21. The locking system of claim 1, further comprising a latch hook shiftable between an open position and a closed position, wherein when the actuating lever is in the first unlocked position, the latch hook is biased to the open position, and wherein when the actuating lever is in the second unlocked position, the latch hook is bi-stably maintained in either the open position or the closed position.

* * * * *